United States Patent [19]
Mita

[11] Patent Number: 5,267,335
[45] Date of Patent: Nov. 30, 1993

[54] MULTI-RESOLUTION IMAGE SCANNER
[75] Inventor: Kikuo Mita, Kanagawa, Japan
[73] Assignee: Eastman Kodak Company, Rochester, N.Y.
[21] Appl. No.: 822,452
[22] Filed: Jan. 17, 1992
[30] Foreign Application Priority Data
Mar. 25, 1991 [JP] Japan ................................ 3-060323
[51] Int. Cl.⁵ .......................... G06K 9/00; G06K 9/38; H04N 3/14
[52] U.S. Cl. ........................................ 382/62; 382/68; 382/50; 358/462; 358/213.11; 250/208.1
[58] Field of Search ................. 382/62, 65, 68, 50, 382/52; 358/462, 464, 466, 482, 483, 213.28, 213.27, 213.11; 250/208.1; 364/810, 828; 307/355, 356, 358

[56] References Cited
U.S. PATENT DOCUMENTS

| | | | |
|---|---|---|---|
| 3,538,445 | 11/1970 | Brennen | 307/355 |
| 3,660,774 | 5/1972 | Eachus | 307/355 |
| 4,750,209 | 6/1988 | Shimura et al. | 358/443 |
| 5,020,118 | 5/1991 | Sugiura | 382/62 |
| 5,047,667 | 9/1991 | Howie | 307/355 |
| 5,151,588 | 9/1992 | Kiri et al. | 250/208.1 |

Primary Examiner—Michael T. Razavi
Assistant Examiner—David Fox
Attorney, Agent, or Firm—Raymond L. Owens

[57] ABSTRACT

An image scanner is provided that receives light reflected from a same position on a document by first, second, and third one-dimensional image sensors arranged in parallel. The second image sensor is a high-resolution image sensor comprising a plurality of photocells, which is disposed between and in a spaced-apart relationship with the first and third one-dimensional image sensors which are each low-resolution image sensors comprising photocells which are larger in size than the photocells of the second one-dimensional image sensor. Electrical image output signals from the first and third low-resolution image sensors are added, and any high-frequency components in the added signal are removed by a low-pass filter for producing signal data relating to the mean brightness of the region around a pixel of interest. The difference between the mean brightness and the brightness of the pixel of interest, as outputted by the second high-resolution image sensor, is then derived to produce an output signal in which points to where the brightness changes in the image are emphasized. Subsequent processing enables textual and other information of interest in the document to be extracted from background information.

2 Claims, 1 Drawing Sheet

MULTI-RESOLUTION IMAGE SCANNER

FIELD OF THE INVENTION

The present invention relates to a document image scanner, and, more particularly, to an image scanner than in the course of binarizing image data extracts target text and pattern information without hindrance from background brightness of the document.

BACKGROUND OF THE INVENTION

Image scanners have come into widespread use as a means of inputting data to devices. However, if the use of image scanners is to increase further, they have to be able to scan text and pattern information with greater precision, speed and economic efficiency. To achieve this, with the exception of certain areas of application, prior art scanners store, transmit and print the scanned information after it has been binarized.

A problem is that the documents that have to be scanned are varied. In many cases the information is written on dark-colored paper, or the documents contain extraneous background information such as discolored areas as found in, for example, a copy of a document that has been copied many times. Thus, it is necessary for an image scanner not only to be able to scan a document image, but to be able to accurately extract the target textual or other information without being affected by background brightness or noise information. In prior art image scanners, the scanned information is subjected to the following processing after it has been digitized and stored in a system memory. First, the information is read out of the system memory and subjected to a prescribed series of iterative sum of products operations to obtain the mean brightness of the pixels around a pixel of interest. The difference between the obtained mean brightness and the brightness of the pixel of interest is then obtained to produce an output signal which emphasizes he points where the brightness in the image changes. In the prior art image scanners, digital filters are generally used to discriminate the textual and other such information of interest from the background information. However, such digital filtering systems are costly, requiring memories and many other expensive parts and components. Additionally, the limited operating speed of such expensive parts and components makes it difficult to increase the speed of such prior art image scanners.

SUMMARY OF THE INVENTION

The present invention is directed to an image scanner that is capable of extracting textual and other information of interest without hindrance of background information using a simpler and less costly structural arrangement than is found in prior art image scanners that use digital filters.

In accordance with the present invention, the image scanner comprises light source for illuminating a document being scanned, high-resolution image sensor means, low-resolution image sensor means, and differential calculation means. The high-resolution image sensor means comprises a plurality of photocells that receive light reflected from, or transmitted by, the document, and convert the intensity of the received light to representative electrical image output signals. The low-resolution image sensor means comprises a plurality of photocells which are substantially larger in size than the photocells of the high-resolution image sensor means. The photocells of the low-resolution image sensor means receive light reflected from, or transmitted by, a location on the document that is substantially identical to the location from which the photocells of the high-resolution image sensor means receive their light, and convert the intensity of the received light to electrical image output signals. The differential calculation means calculates the difference between the concurrent electrical image output signals of the photocells of the high-resolution image sensor means and the low-resolution image sensor means, and generates a difference output signal.

Viewed from another aspect, the low-resolution image sensor means comprises a first and a second low-resolution image sensor. Each of the first and second low-resolution image sensors are disposed on a separate opposing side of the high-resolution image sensor means and provide a separate electrical image output signal. The electrical image output signals from the first and second low-resolution image sensors are added, low-pass filtered, and then amplified to a predetermined level before being introduced to one input of the differential calculation means. The difference output signal from the differential calculation means is then processed by an image processing means to extract the textual or other information from the document being scanned.

Viewed from another aspect, the present invention is directed to a method of scanning a document to extract textual and other information thereon and comprises the following steps. In a first step, the document being scanned is illuminated with a light source. In a second step, light reflected from, or transmitted by, the document is detected with a high-resolution image sensor means comprising a plurality of photocells that convert the intensity of the light received from the document to representative electrical image output signals. In a third step, concurrent with the second step, a low-resolution image sensor means detects light reflected from, or transmitted by, a location on the document that is substantially identical to the location from which the high-resolution image sensor means receives its light. The low-resolution image sensor means comprises a plurality of photocells that convert the intensity of the received light from the document to electrical image output signals. The photocells of the low-resolution image sensor means are substantially larger in size than the photocells of the high-resolution image sensor means. In a fourth step, the difference between the concurrent electrical image output signals from the high-resolution image sensor means and the low-resolution image sensor means are calculated, and a difference output signal is generated for use in subsequent processing to extract textual and other information from the document being scanned.

Thus, with the image scanner according to this invention, light reflected, or transmitted from, substantially the same position on a document is received by a plurality of image sensors, each having a different resolution, which convert the intensity of the received light to electrical image output signals. A difference between the electrical image output signals is then calculated. This difference is used as a basis for producing an output in which portions in the image where there is a change in the brightness are emphasized, thereby enabling the textual and other information of interest to be correctly extracted from the background information.

The present invention and its various advantages will be better understood from the following more detailed description taken with the accompanying drawings and claims.

The drawings are not necessarily to scale.

DETAILED DESCRIPTION

Figure 1:
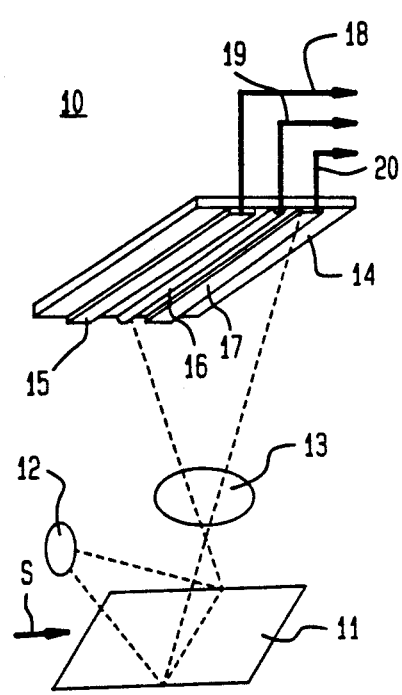
FIG. 1 shows a view in perspective of principal parts of an optical arrangement of an image scanner including three one-dimensional image sensors in accordance with the present invention.

Referring now to FIG. 1, there is shown principal components of an optical arrangement of an image scanner 10 in accordance with the present invention. The optical arrangement of the image scanner 10 comprises a light source 12, an optical system 13, a first one-dimensional image sensor 15, a second one-dimensional image sensor 16, and a third one-dimensional image sensor 17 which are mounted on a substrate or board 14. More particularly, in the image scanner 10, the light source 12 is used to illuminate a document 11 that is moved at a constant speed in a direction indicated by an arrow "S". The pattern of alphanumeric characters and other information (not shown) on the document 11 is illuminated by the light source 12 and is focussed by the optical system 13 to form an image thereof on the three one-dimensional image sensors 15, 16 and 17 which are arranged in parallel on the substrate or board 14. The optical system 13 comprises lenses, optical filters and the like (all of which are not shown). The one-dimensional image sensors 15, 16, and 17 generate separate electrical image output signals over separate leads 18, 19 and 20, respectively. Each of the electrical image output signals on leads 18, 19, or 20 are representative of the intensity of the light received by the one-dimensional image sensor 15, 16 or 17, respectively.

Figure 2:
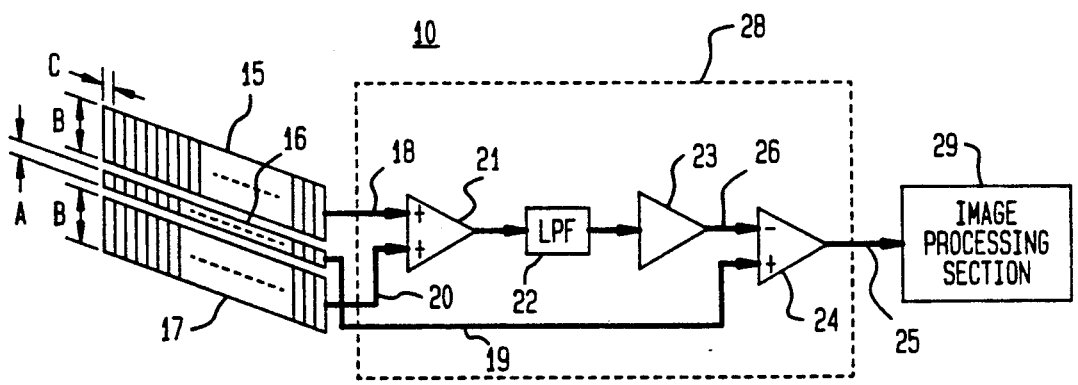
FIG. 2 shows a schematic diagram of the image scanner of FIG. 1 including a more detailed view of the three one-dimensional image sensors, and signal processing circuitry for use therewith.

Referring now to FIG. 2, there is shown the one-dimensional image sensors 15, 16, and 17 of FIG. 1, a sensor signal processing circuit 28 (shown within a dashed line rectangle) which processes the output image signals on leads 18, 19, and 20, and an image processing section 29 connected via lead 25 to an output of the sensor signal processing circuit 28. The sensor signal processing circuit 28 comprises a serial connection of a first amplifier 21, a low-pass filter (LPF) 22, a second amplifier 23, and a third amplifier 24. The first amplifier 21 receives the output image signals on leads 18 and 20 from the one-dimensional image sensors 15 and 17, respectively, and the third amplifier 24 receives the output signal from the second amplifier 23 on a lead 26 and the output image signal on the lead 19 from the one-dimensional image sensor 16.

Of the one-dimensional image sensors 15, 16, and 17, the one-dimensional image sensor 16 is disposed between the image sensors 15 and 17 and is a high-resolution image sensor comprising a plurality of small photocells which each have a height of "A" and a width of "C". The other two one-dimensional image sensors 15 and 17 are arranged on separate sides of the one-dimensional image sensor 16, and are low-resolution image sensors comprising a plurality of relatively large photocells each having a height of "B" and a width of "C". Dimensions "A" and "C" may, for example, be approximately 65 micrometers, and dimension "b" may, for example, be approximately 1000 micrometers. The photocells making up the three one-dimensional image sensors 15, 16 and 17 are arranged to operate in mutual synchronization in converting the received light from the document 11 into a stream of electrical output image signals on leads 18, 19, and 20, respectively. The electrical image output signals on leads 18 and 20 outputted from the one-dimensional image sensors 15 and 17, respectively, are provided as separate inputs to the first amplifier 21. The first amplifier 21 adds the image output signals from leads 18 and 20. The resultant output signal from the first amplifier 21 is passed through the low-pass filter 22 to remove the high-frequency components, and is then amplified to a prescribed level by the second amplifier 23 which has a variable gain. An amplified output signal on lead 26 from the second variable-gain amplifier 23 is provided to one input (a negative input) of the third amplifier 24 (e.g., a differential amplifier). The image signal on lead 19 outputted from the second one-dimensional image sensor 16 is provided directly to a second input (a positive input) of the third amplifier 24. The third amplifier 24 derives the difference between the image signal on lead 19 from the one-dimensional image sensor 16 and the amplified signal on lead 26 from the second amplifier 23, and outputs this difference as differential signal on lead 25. The differential output signal on lead 25 from the third amplifier 24 is provided as an input to an image processing section 29. The image processing section 29 processes the difference output signal from the third amplifier 24 to extract textual and other information that is the object of interest on the document 11 being scanned.

In operation, the pattern of alphanumeric characters and other information on the document 11 is illuminated by the light source 12 and focussed by the optical system 13 to form an image thereof on the one-dimensional image sensors 15, 16, and 17 arranged on the board 14. The respective photocells forming the three one-dimensional image sensors 15, 16, and 17 synchronously convert the light received from the document 11 to separate electrical signals which are outputted as image signals on leads 18, 19, and 20, respectively. When a complete set of output image signals for each scanned line of the document 11 are provided on leads 18, 19, and 20 from the one-dimensional image sensors 15, 16, and 17, respectively, the document 11 is moved in the direction of the arrow S by an amount corresponding to one line. It is to be understood that the one line referred to hereinabove by which the document 11 is moved corresponds to the scanning resolution of the central one-dimensional image sensor 16.

The above-described procedure for processing one line of the document 11 is repeated for the ensuing lines, with the respective photocells forming the one-dimensional image sensors 15, 16, and 17 working in unison to output the image signals on leads 18, 19, and 20, respectively, that correspond to the intensity of the received light, until the whole of the document 11 has been scanned.

Figure 3:
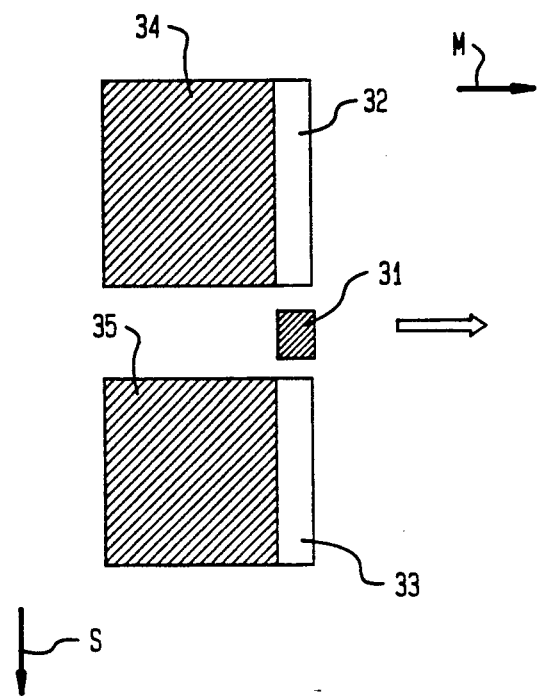
FIG. 3 shows a diagram indicating the positional relationship of the regions scanned by photocells associated with each of the three one-dimensional image sensors of FIGS. 1 and 2.

Referring now to FIG. 3, there is shown the positional relationship of regions 31, 32, 33, 34, and 35 scanned by the photocells used with each of the one-dimensional image sensors 15, 16, and 17. The arrow designated "M" indicates the direction within a line in which photoelectric conversion by the photocells takes place, i.e. the primary scanning direction. The arrow designated "S" indicates the direction in which the document 11 is moved, i.e., the secondary scanning direction.

In operation, a small picture element (pixel) 31, the size of which corresponds to the scan resolution, is scanned by the one-dimensional image sensor 16 and is provided as the electrical image output signal on lead 19 to the second input of the third amplifier 24 of FIG. 2. Concurrent therewith, after being scanned by the respective one-dimensional image sensors 15 and 17, the mean brightness levels of the larger regions 32 and 33 that bracket pixel 31, extending in the secondary scanning direction, are added by the first amplifier 21 of FIG. 2. Because the low-pass filter 22 of FIG. 2 blocks high-frequency components received in its input signal, the input signal to filter 22 is converted to an output signal that indicates the mean brightness of a surrounding region. The surrounding region includes regions 34 and 35 that are extended in the opposite direction to that of the primary scanning direction shown by arrow "M". The output signal from the low-pass filter 22 is then passed through the second variable-gain amplifier 23 to produce the amplified signal on lead 26 which is provided to the negative input of the third amplifier 24.

The third amplifier 24 produces a differential output signal on lead 25 that corresponds to the difference between the image output signal on lead 19 derived from the pixel 31, and the amplified signal on lead 26 that includes the mean brightness of the surrounding regions 32, 33, 34 and 35. This enables the pixel 31 to be clearly discriminated from the background brightness. Thus there is provided a basis for the document patterns of alphanumeric characters and the like to be emphasized and extracted by the image processing section 29.

It is preferred that the one-dimensional image sensors 15, 16, and 17 are arranged on a single substrate or board, which facilitates fabrication by eliminating the need to align the one-dimensional image sensors 15, 16, and 17 in parallel. The signal processing circuit 28 can comprise inexpensive amplifiers, resistors and other such components, which permit the operating speed of the present image scanner to be higher than that of prior art image scanners using digital filter systems.

It is to be appreciated and understood that the specific embodiments of the invention described hereinbefore are merely illustrative of the general principles of the invention. Various modifications may be made by those skilled in the art which are consistent with the principles set forth.

What is claimed is:

1. An image scanner comprising:
   light source means for illuminating a document being scanned;
   high-resolution image sensor means comprising a plurality of photocells that receive light reflected from, or transmitted by, the document and convert the intensity of the received light to representative electrical image output signals;
   low-resolution image sensor means comprising a plurality of photocells which (a) are substantially larger in size than the photocells of the high-resolution image sensor means (b) receive light reflected from or transmitted by a location on the document that is substantially identical to the location from which the high-resolution image sensor means receive light, and (c) convert the intensity of the received light to representative electrical image output signals, such low-resolution image sensor means includes a first low-resolution image sensor disposed on a first side of the high-resolution image sensor means and having a plurality of photocells which are substantially larger in size than the photocells of the high-resolution image sensor means, and convert the received light to first electrical image output signals and a second low-resolution image sensor disposed on a second side opposite the first side of the high-resolution image sensor means and having a plurality of photocells which are substantially larger in size than the photocells of the high-resolution image sensor means, and convert the received light to second electrical image output signals; and
   differential calculation means for calculating the difference between the concurrent electrical image output signals of the photocells of the high-resolution image sensor means and the low-resolution image sensor means, and for generating a difference output signal such differential calculation means including a first amplifying means for adding the first and second electrical image output signals from the first and second low-resolution image sensors and generating an output signal representative of such addition, filtering means for receiving the output signal from the first amplifying means and generating an output signal wherein high-frequency components of the output signal from the first amplifying means are removed, second amplifying means for amplifying the ouput signal from the filtering means to a predetermined level, and difference means for concurrently receiving the electrical image output signals from the high-resolution image sensor means and the amplified signal from the second amplifying means, and generating therefrom the difference output signal from the differential calculation means.

2. The image scanner of claim 1 further comprising image processing means for processing the difference output signal from the differential calculation means to extract textual and other information from the document being scanned.

* * * * *